United States Patent
Gerrish et al.

(10) Patent No.: US 6,631,027 B2
(45) Date of Patent: Oct. 7, 2003

(54) UNIVERSAL CONTROLLER FOR AN OPTICAL AMPLIFIER THAT OPERATES OVER A WIDE DYNAMIC RANGE OF OPTICAL SIGNALS AND OPTICAL AMPLIFIERS UTILIZING SUCH CONTROLLERS

(75) Inventors: Kevin S. Gerrish, Elmira, NY (US); Muhidin Lelic, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 164 days.

(21) Appl. No.: 09/789,915

(22) Filed: Feb. 20, 2001

(65) Prior Publication Data

US 2002/0093729 A1 Jul. 18, 2002

Related U.S. Application Data

(60) Provisional application No. 60/200,690, filed on Apr. 29, 2000, provisional application No. 60/196,596, filed on Apr. 13, 2000, and provisional application No. 60/196,784, filed on Apr. 13, 2000.

(51) Int. Cl.[7] ................................................ H01S 3/00
(52) U.S. Cl. ................................................ 359/341.41
(58) Field of Search ........................ 359/341.41, 341.4

(56) References Cited

U.S. PATENT DOCUMENTS

| 5,363,385 | A |   | 11/1994 | Heidemann |           |
|-----------|---|---|---------|-----------|-----------|
| 5,703,711 | A |   | 12/1997 | Hamada    |           |
| 5,923,462 | A |   | 7/1999  | van der Plaats |      |
| 6,038,063 | A | * | 3/2000  | Tsuda et al. | 359/341 |
| 6,366,395 | B1| * | 4/2002  | Drake et al. | 359/341.41 |
| 6,407,854 | B1| * | 6/2002  | Shum      | 359/341.41 |

OTHER PUBLICATIONS

Motoshima at al.,"Dynamic compensation of transient gain saturation in erbium–doped fiber amplifiers by pump feedback control," Technical Digest OFC'93, 40–42 (1993).

Srivastava et al., Fast control in erbium–doped fiber amplifier, Technical Digest OAA '96, 24–27 (1996).

Karasek et al., "Analysis of Dynamic Pump–Loss Controlled Gain–Locking System for Erbium–Doped fiber amplifiers," IEEE Photonics Technical Letters, 10, 1171–1173 (1998).

Yoon et al., "Reference level free multichannel gain equalization and transient gain suppression of EDFA with differential ASE power monitoring," IEEE Photonics Technology Letter, vol 11, No 3, Mar. 1999, pp. 316–318.

Okamura, "Automatic optical loss compensation with erbium–doped fiber amplifier," Journal Of Lightwave Technology, 16 (5), (1995)

Richards et al., "A theoretical investigation of dynamic all–optical automatic gain control in multichannel EDFAs and EDFA cascades," IEEE J. Topics in Quantum in Quantum Electronics, 3 (4) (1997).

Park et al., "Dynamic gain and output control in gain–flattened EDFA," IEEE Prot. Tech. Letters, 10 (6), 1998, pp. 787–789.

(List continued on next page.)

Primary Examiner—Mark Hellner
(74) Attorney, Agent, or Firm—Svetlana Z. Short

(57) ABSTRACT

An amplifier characterized by gain and output power comprises: (i) at least one gain medium; (ii) at least one pump supplying optical power into the gain medium; and (iii) a controller controlling the gain and the output power of the amplifier. The controller includes a signal compression circuit to cover a wide dynamic range for optical input and output signals, so that resolution for low optical signals is better than resolution for high optical signals.

17 Claims, 11 Drawing Sheets

OTHER PUBLICATIONS

Takahashi et al., "An output power stabilized erbium doped fiber amplifier with automatic gain control," IEEE J. Selected Topics in Quantum Electronics, 3 (4) (1997).

Landousies et al., "Low–power transient in multichannel equalised and stabilised gain amplifier using passive gain control," Electronics Letters, Sep. 26, 1996, Vol. 32, No. 20.

Yadlowsky, "Independent Control of EDFA Gain Shape and Magnitude Using Excited–State Trapping", IEEE Photonics Technology Letters, vol. 11, No. 5, May 1999, pp. 539–541.

Desurvive et al., "Dynamic Gain Compensation in Saturated Erbium–Doped Fiber Amplifiers", IEEE Photonics Technology Letters, vol. 3, No. 5, May 1991, pp. 453–455.

Desurvive, "Erbium Doped Fiber Amplifiers—Principles and Applications," John Wiley & Sons, Inc. (1994), see Chapter 6, sections 3–4 9 pp. 469–487).

Giles et al., "Modeling Erbium–Doped Fiber Amplifiers", Journal of Lightwave Technology, vol. 9, No. 2, Feb. 1991, pp. 271–283.

* cited by examiner

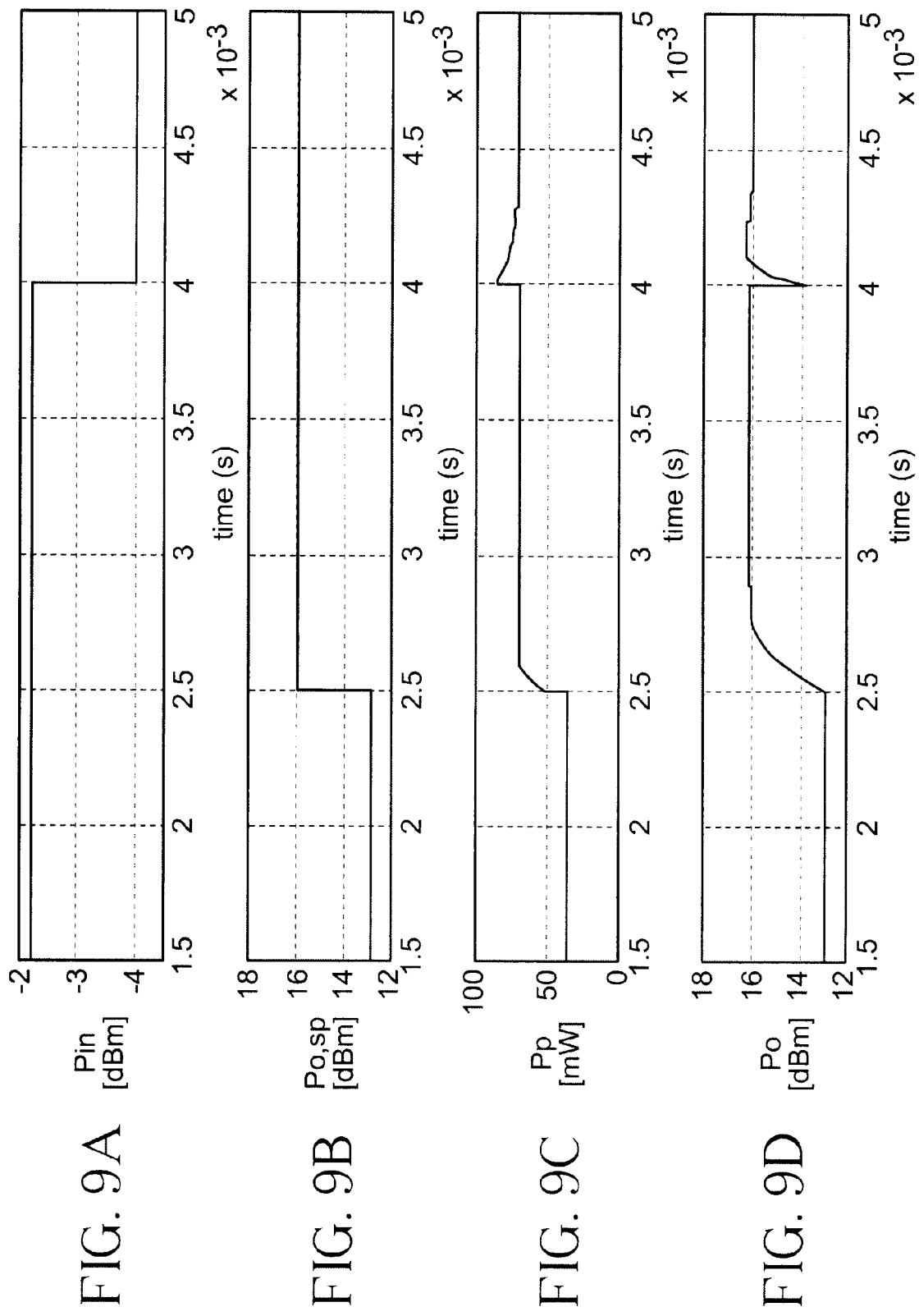

UNIVERSAL CONTROLLER FOR AN OPTICAL AMPLIFIER THAT OPERATES OVER A WIDE DYNAMIC RANGE OF OPTICAL SIGNALS AND OPTICAL AMPLIFIERS UTILIZING SUCH CONTROLLERS

CROSS-REFERENCES TO RELATED APPLICATIONS

Reference is made to commonly assigned pending provisional application as the parent application serial No. 60/200690, filed on Apr. 29, 2000 entitled "UNIVERSAL CONTROLLER FOR OPTICAL AMPLIFIERS" and Provisional patent application serial No. 60/196596, filed on Apr. 13, 2000 entitled "METHOD FOR CONTROLLING PERFORMANCE OF OPTICAL AMPLIFIERS", and provisional application serial No. 60/196784 filed Apr. 13, 2000 in the name of Gerrish et al. and entitled "OPTICAL AMPLIFIERS WITH A SIMPLE GAIN/OUTPUT CONTROL DEVICE" which are incorporated by reference, herein.

FIELD OF THE INVENTION

This invention relates to an optical amplifier with an improved electronic controller. This controller operates in the gain or output power control mode and works over wide dynamic range of gain or optical signal powers.

BACKGROUND OF THE INVENTION

In recent years optical amplifiers have undergone considerable transformation. Increased demand for more data transfer resulted in development of wavelength division multiplexing (WDM) technology, which allows more data to be transmitted over one fiber by increased channel count (i.e., a larger number of narrower wavelength ranges within the same predetermined wavelength window). This WDM technology suffers from unwanted effects, such as a variation in gain and output power when the input signal power is constant (for example, due to aging of the amplifier or due to stresses in the amplifier), and cross talk between different channels, for example, when the input signal is modulated at a low frequency. The low frequency is a frequency of up to 100 Hz. This low frequency modulation can be present, for example, due to the addition or dropping of some to the channels, or due to sudden loss of signal at certain wavelengths. These unwanted effects have a negative influence on the power transients (i.e., fluctuations of output optical signal power) of surviving channels, which results in a poor performance of the signal transmission, expressed in an increased bit error rate (BER). In order to minimize the unwanted output signal power fluctuation and the power transients, it is common to introduce a mechanism for controlling either the output signal power or the gain of the optical fiber amplifier. Gain is the ratio of the optical signal output power to the optical signal input power.

There are several known approaches for controlling output signal power or the gain of the optical fiber amplifier. The first approach, known as the electronic feedback/feedforward approach, utilizes electronic circuitry to control power transients caused by the change of input power, due to adding or dropping of the optical channels. More specifically, amplifier gain or power is controlled by analog tuning of the electronic components, for example by changes resistor's or capacitor's values. This approach allows the user, such as a communication company, to minimize power transients in any given optical amplifier by controlling either the amplifier gain or the amplifier output power, but not both. This approach also limits accuracy of gain control when signal power is small. Finally, this approach does not compensate for amplifier noise, such as ASE (amplified spontaneous emission).

The second approach, known as the optical feedback control approach, utilizes only optical components to control power transients of the optical fiber amplifier. This approach is even less flexible than the all-electronic approach described above, because any change in power or gain control requirements requires the change in optical components.

Another approach is to utilize an electronic controller and an additional monitoring channel. This monitoring channel provides a command signal based on information about the change in number of incoming channels. The gain controller, based on these commands, automatically switches between the power control and gain control modes in order to keep amplifier performance within predetermined limits. Furthermore, it is desirable that optical amplifiers operate over a wide dynamic range of input optical power, output optical power or gain while preserving control accuracy. This is especially difficult if a digital controller is utilized and when the input signal is low (less than −28 dBm).

Erbium doped fiber amplifiers (EDFA) are very important components in the optical communication networks. These amplifiers are widely used to provide gain for wavelength division multiplexed optical communications. When high-speed data (over 2 Gbits/sec) is transmitted over the EDFA, the amplifier gain is nearly undisturbed by the fast signal modulation and there is no cross talk between the communication channels. However, low frequency fluctuation of input signal caused, for example, by adding or dropping one or more channels of WDM signal, can cause considerable fluctuation in the inversion levels of Er doped fibers. The negative effects of low frequency fluctuation of the input signal are multiplied if there more than one EDFA is present in the network.

SUMMARY OF THE INVENTION.

According to one aspect of the present invention an amplifier characterized by gain and output power comprises: (i) at least one gain medium; (ii) at least one pump supplying optical power into the gain medium; (iii) a controller controlling the gain and the output power of the amplifier. The controller includes a signal compression circuit to cover a wide dynamic range for optical input and output signals, so that resolution for low optical signals is better than resolution for high optical signals.

According to one embodiment of the present invention the controller utilizes a logarithmic circuit. According to another embodiment of the present invention the controller utilizes an electronic gain switch circuit.

According to one embodiment of the present invention an amplifier characterized by gain and output power comprises: (i) at least one gain medium; (ii) a pump supplying optical power into said gain medium; (iii) a controller controlling said gain and said output power of said amplifier. This controller includes an electronic gain switch to cover a wide dynamic range for optical input and output signals, so that resolution for low optical signals is better than resolution for high optical signals.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

FIGS. 9A–9D illustrate the closed-loop performance of the amplifier with automatic power control mode.

DETAILED DESCRIPTION OF THE PREFFERED EMBODIMENTS

The negative effects of low frequency fluctuation of input signal to an EDFA can cause cross talk between channels and decrease signal to noise ratio of the amplifier. Therefore, it is crucial to remove or minimize low-frequency fluctuation effects before they affect the amplifier performance. The exemplary amplifiers of the present invention provide suppression of fast (about 50 μseconds or faster) power and gain transients, as well as pump temperature control and re-configurable signal processing. In addition, in order to be able to control gain or power transients, it is preferable that the amplifier's controller accommodates other communication system requirements and has the ability to perform some additional control function (for example, pump laser temperature control, coil temperature control). Furthermore, the controller may also provide monitoring, self-testing, and other diagnostic functions, for example alarm processing. A remote operator can interact with the controller by remotely issuing the commands and monitoring the performance of the amplifier. These commands and monitoring can be implemented via serial interface, parallel interface, or Ethernet. As stated above, according to the present invention the optical amplifier includes an electronic controller. This electronic controller preferably provides all of the necessary functions by digital and analog electronics and software. The exemplary electronic controller disclosed herein is a two-processor unit embedded system. However, a single processor unit may also be utilized. The electronic controller described in this section is flexible enough to accommodate multiple optical amplifier designs.

Figure 1:
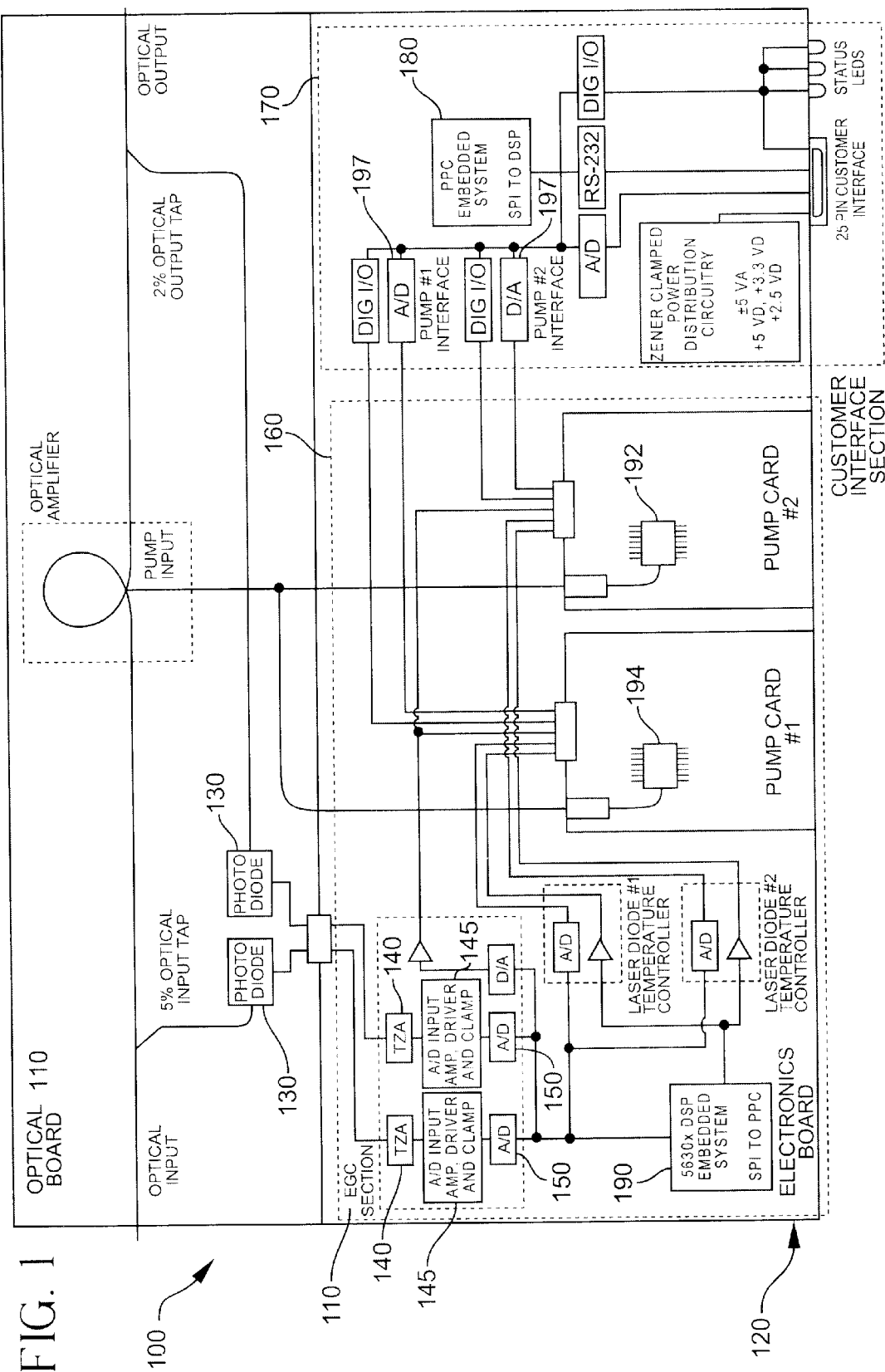
FIG. 1 is a schematic diagram of an optical amplifier, which includes an electronic controller.
Figure 2:
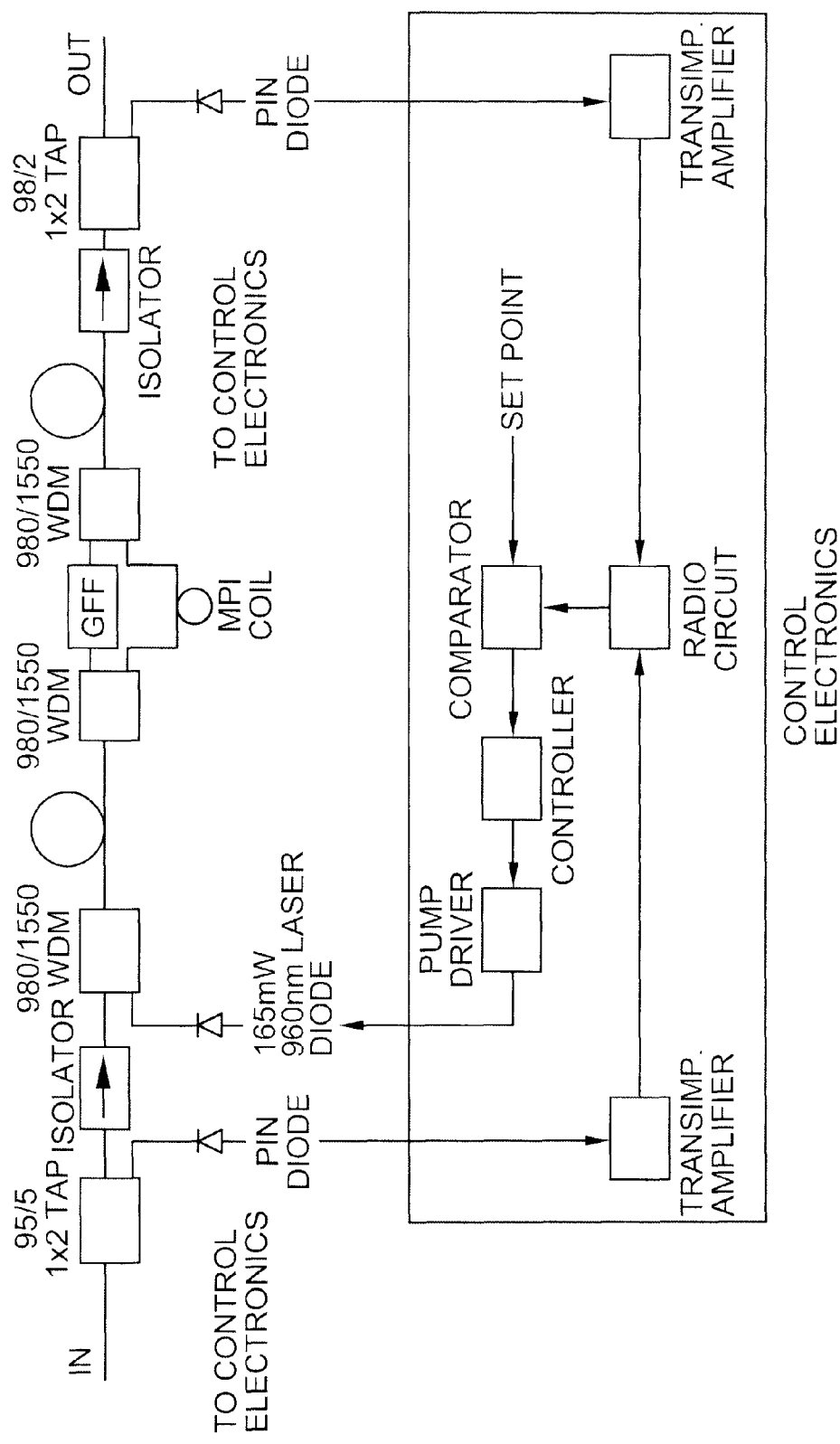
FIG. 2 is a schematic diagram of exemplary optical amplifier of FIG. 1.
Figure 3:
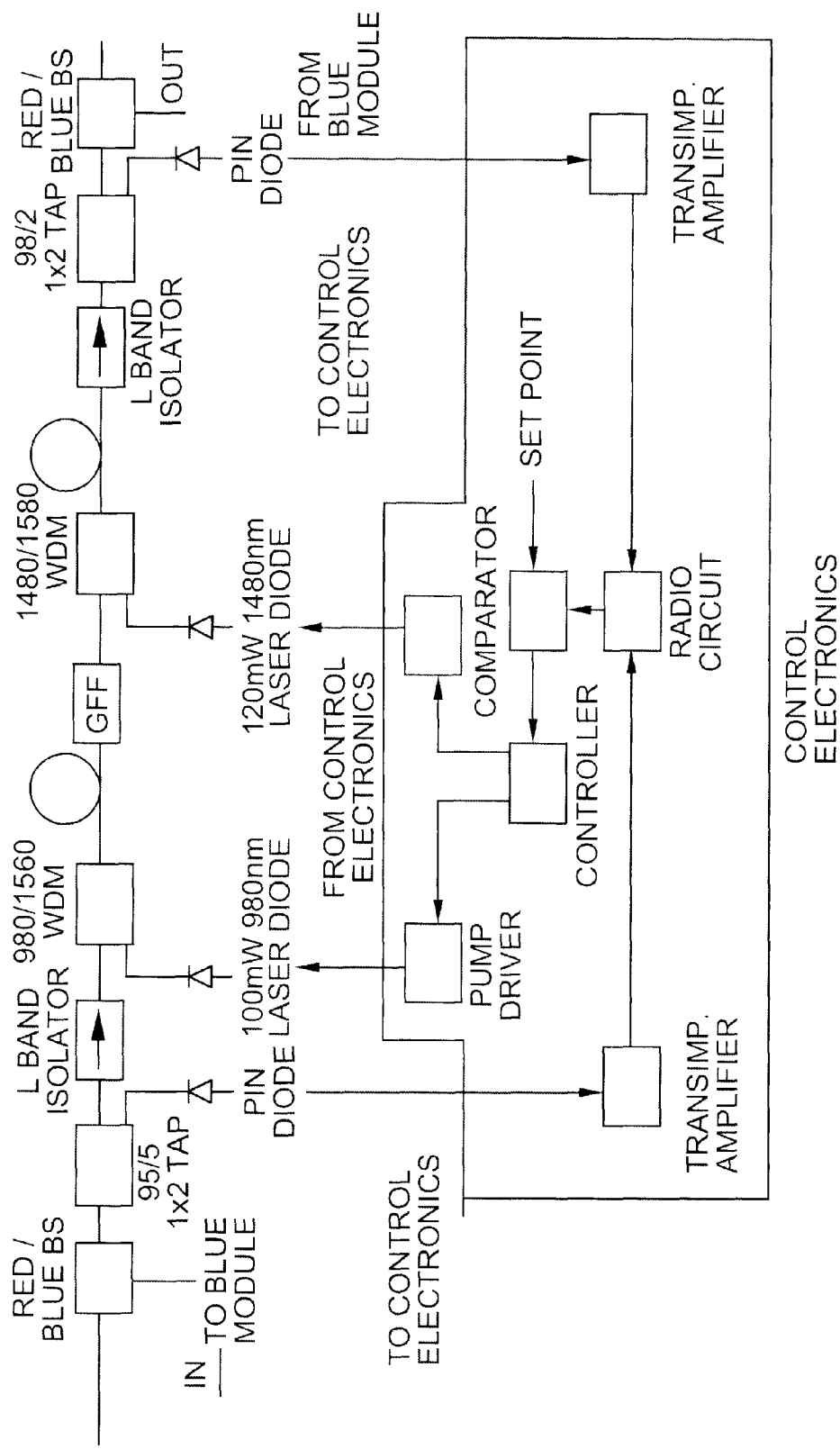
FIG. 3 is a schematic diagram of another exemplary optical amplifier.

FIG. 1 illustrates an exemplary EDFA 100. This amplifier 100 includes separate optical section 110 and electronic controller 120. FIGS. 2 and 3 show, in more detail, exemplary optical section 110 of the EDFA 100 of FIG. 1. FIG. 2 illustrates an optical section 110 that utilizes a single pump laser. FIG. 3 illustrates an alternative optical section 110 that utilizes two pump lasers. The amount of the optical power, delivered by the EDFA 100 is determined by the electronic gain (or the output power) control section of the electronic controller 120. In this EDFA 100 the actual amount of input and output optical power is monitored by appropriate photo-diodes 130. Signals from the photo-diodes 130 are conditioned by the transimpedance amplifiers 140 and converted to a digital form by A/D (Analog to Digital) converters 150. Driver circuit 145 are situated between the transimpedance amplifiers 140 and the A/D (Analog to Digital) converters 150. These driver circuits 145 include logarithmic amplification circuits or, alternatively, electronic gain switch circuits. These circuits are described in detail further down in this specification. The electronic controller 120 includes two main sections—automatic gain/power/temperature control (AGC) embedded system section 160 and communication/alarm processing (CAP) embedded system section 170.

The AGC section 160 provides high-speed gain/power control algorithms. Its main function is sensing of the input and output optical signals, for example by photo diodes and utilization of this information to provide high-speed control of the pump laser diode. Secondary functions include pump laser diode temperature control and communications implemented by another processor 180.

This AGC section 160 relies on a fast fixed-point arithmetic DSP processor 190, such as Motorola 56311™ processor that has built in a co-processing unit. The AGC section 160 performs all classical feedback loop control tasks such as, for example, reading input and output optical power, calculating gain, comparing gain with its desired value and calculating the control signal to control the laser pump. It may also control the coil temperature, the pump laser temperature to improve gain spectrum. The DSP processor 190 is programmed to work as a multi-rate sampling unit, because of two different control speeds for the gain/power transients and pump temperature. An optional (second) pump laser 192 may be controlled at a different speed from the speed of the principal pump laser 194. Therefore, the second pump may be controlled either by the AGC section 160 or the CAP section 170. One and two pump laser control configurations are illustrated in FIGS. 2 and 3, respectively.

The CAP section's primary responsibility is to maintain the link from the external user to the optical amplifier 100. In addition, CAP section 170 maintains communications with the AGC section 160.

While capable of performing the tasks of the CAP section 160, the AGC section 170 is optimized to efficiently complete a high-speed digital control loop. This is accomplished by the analog-to-digital conversion of the appropriate input values (input and output optical power for this case), conducting the proper digital filtering algorithm with optimized software and creating the output control signal (digital-to-analog conversion driving a laser diode pump signal for this case). Other options for the output control signal includes, but are not limited to, PWM (pulse width modulation) for the pump temperature control.

A challenge that must be overcome in designing the digital controller 120 is problem created by the dynamic range of the input and output signals as well as the desired amplifier gain range. More specifically, the DSP processor 190 has a limited processing speed. The A/D converter has limited number of bits of resolution. Therefore, the controller 120 should provide a balance between the controller sampling speed and the number of bits of resolution of the A/D (analog to digital) converter. The electronic controller 120 of this embodiment may utilize at least two alternative methods to overcome this problem. These methods are signal compression, which utilizes logarithmic amplifiers and electronic gain (range) switching method.

Logarithmic Amplification/compression

The driver circuits 145 may include, for example, a logarithmic amplification (compression) circuit 195A (not shown). The Logarithmic amplification (compression) circuit 195A performs a logarithmic calculation (such as log10, for example) of electrical input or output signals, corresponding to input and output optical powers, with analog electronics. In this way, the wide range of input or output optical powers is compressed and can be represented by a limited number of bits of A/D converter. This compressed electrical signal provided by the logarithmic amplification circuit is sampled and converted to the digital domain. At this point, this digital signal can be processed directly, or decompressed by performing an anti-log function with the digital-processing algorithm. Furthermore, when the electrical signal (corresponding to optical power) is transformed by a logarithmic function, input or output signals corresponding to low optical power can be represented by a larger number of bits, improving the resolution of these signals and therefore, improving the accuracy of gain/output power control.

Dynamic Range Switching

The other option for increasing dynamic range performance involves direct control of the value of the analog input signal that enters the A/D converter. To increase the resolution of the conversion the A/D converter needs to see a higher analog signal (higher voltage) representing optical signal power when optical input signal is small. Thus, section 160 includes A/D converter, a TZA (trans-impedance amplifier) that converts electrical current values, provided to it by a photo-detector, to voltage, and also includes A/D drivers which convert voltage provided by a TZA (trans-impedance amplifier) to a different voltage range suitable as input to the A/D converter. When this approach is utilized, the A/D driver circuit 145 includes a gain switch 195B. When the optical input signal is small (for example, less than −25 dBm), this gain switch 195B multiplies (for example by a factor of 16) and thus increases the analog signal provided to the A/D converter, which will increase resolution (conversion accuracy) for the low input signals. Thus, in normal operating mode, when the optical signals are low or not very large, the gain switch of A/D drivers would be set to its maximum value, allowing for the best signal-to-noise ratio.

If either of the input signals to the drivers 145 (i.e., the signals corresponding to the optical input and output powers, respectively) becomes very large, an overflow condition will result. The digital value sampled by the AGC section 160 will be at it's maximum, and will not represent the actual value corresponding to the power of the optical signal. The AGC section 160 automatically recognizes that the input signal is in an overflow condition (i.e. the input value being at maximum for a pre-defined, minimum period of time). At this point, the electronic gain of the saturated A/D driver can be reduced with the proper synchronization with the digital processing algorithm. With this gain reduced, the analog input signal to the A/D converter would no longer be in an overflow condition and normal control processing continues. It is preferable that a hysteresis is used to avoid unnecessary, oscillatory gain switching, caused by noise. This noise may be introduced by fluctuations in the optical signal power or can be introduced by electronic circuits.

Another novel feature of this amplifier involves the usage of fast electronic A/D converters 197 designed for use in a different industry (in this case, the audio industry). The multiple A/D converters 197 are pre-packaged in a single chip, take very little space and are more reliable than if multiple separate A/D chips are used. Therefore, by utilizing a single chip A/D converters 197 we achieve reduced cost and maximum product lifetime. These single chip A/D converters 197 enable simultaneous sampling of electrical signals representing temperature of the pump lasers. This simultaneous sampling allows the AGC section 160 to control the laser diode temperature with minimal processing time. Once the signals representing the input and output optical powers and temperature of the pump lasers are sampled, the digital nature of the AGC section 160 allows easy implementation of different control modes. For example, this controller 120 utilizes two alternative control modes: (i) optical output power control and (ii) optical gain control mode. The control modes are selected by the operator, via remote commands, for example. Only one control mode is used at the time and the switch from one mode to another mode is be made by operator's command.

With the controller 120 operating in optical output power control mode, the AGC section 160 must produce the proper control signal to ensure the optical output power of the EDFA is held at a constant or near a constant desired value.

Figure 4A:
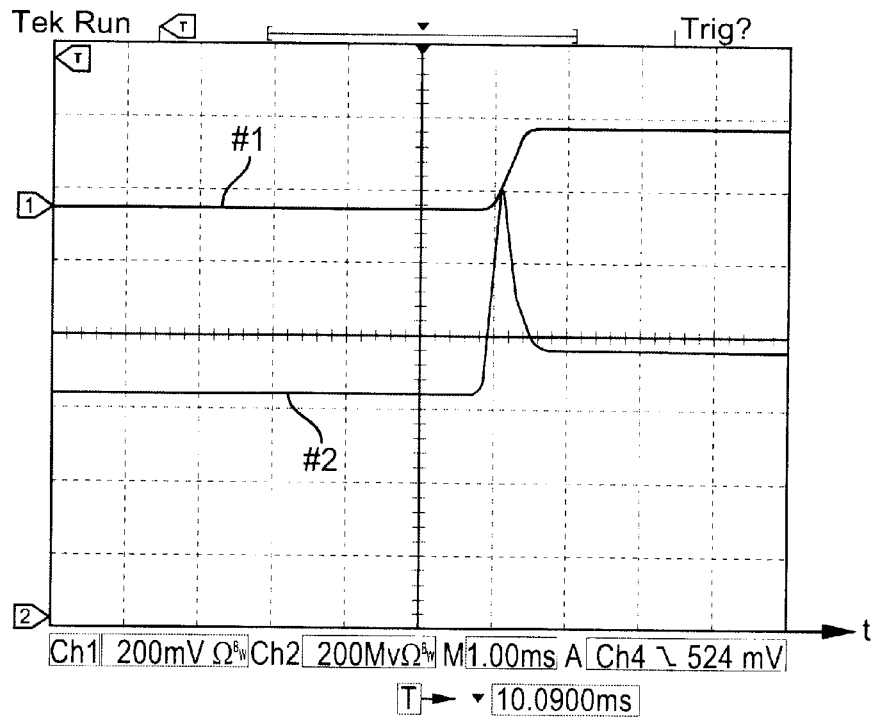
FIGS. 4A–4D illustrate the behavior of the amplifier of FIG. 1 during transient regime, when channels are added a dropped.

The amplifier is required to perform well in suppression of output power transients. FIG. 4A shows oscilloscope trace illustrating the transient behavior of amplifier total input and out put powers without the presence of the electronic gain controller. It illustrates the worst-case scenario, where in addition to one existing channel in the amplifier new 32 channels are introduced to the amplifier at t≈5.8 msec. More specifically, curve #1 of the FIG. 4A shows that a change in total optical input power occurs at about t≈5.8 msec (increased signal). Curve #2 of the FIG. 4A represents total optical output power. More specifically, this curve shows a large transient spike, at time t≈5.8 msec, corresponding to the change in the input optical power.

Figure 4B:
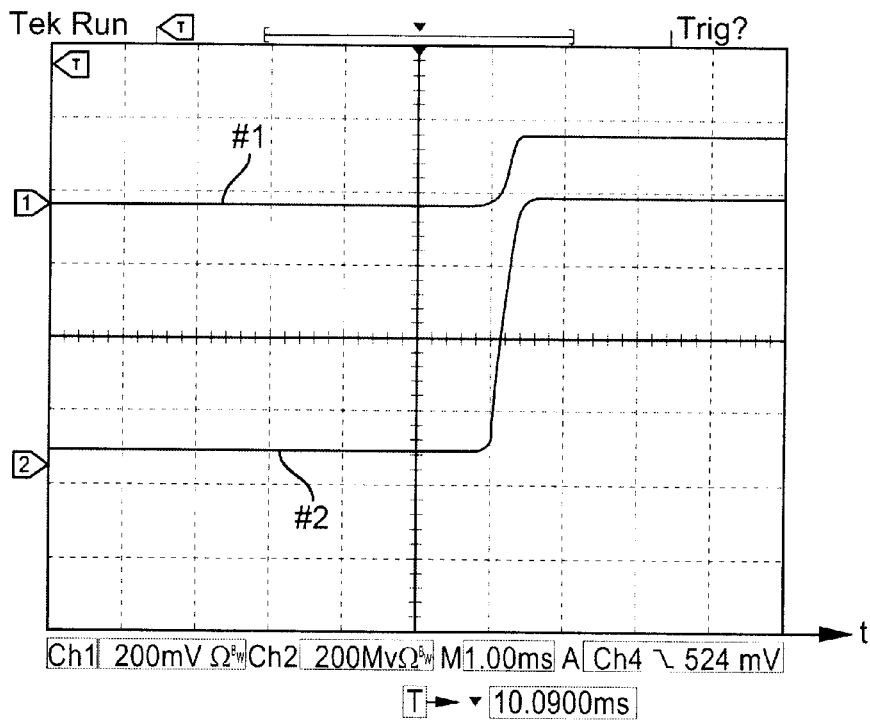

FIG. 4B represents the behavior of the same amplifier with the functional electronic gain controller. More specifically, it shows that the increase in optical output power is now proportional to the increase in optical input power and the absence of the transient output power spike. It is noted, the gain was held at 20 dB.

Figure 4C:
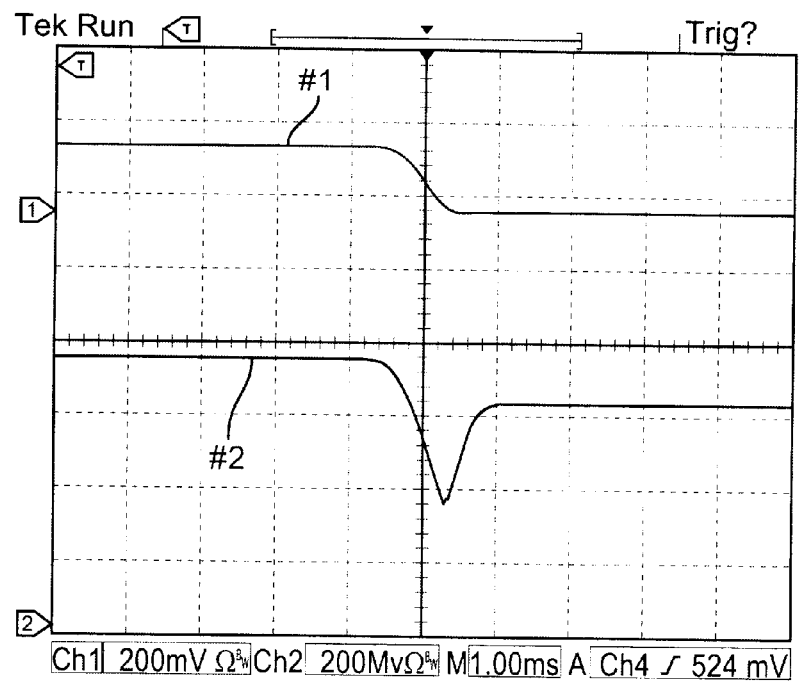

FIG. 4C illustrates transient behavior of amplifier without the electronic gain controller. It illustrates the worst-case scenario, where the 32 of 33 channels are dropped at time t≈5.8 msec and one channel is left in the amplifier. More specifically, curve #1 of the FIG. 4A shows that a change in total optical input power occurs at about t≈5.8 msec (decreased signal power). Curve #2 of the FIG. 4C represents total optical output power. More specifically, this curve shows a large negative transient spike, at time t≈5.8 msec, corresponding to the change in the input optical power.

Figure 4D:
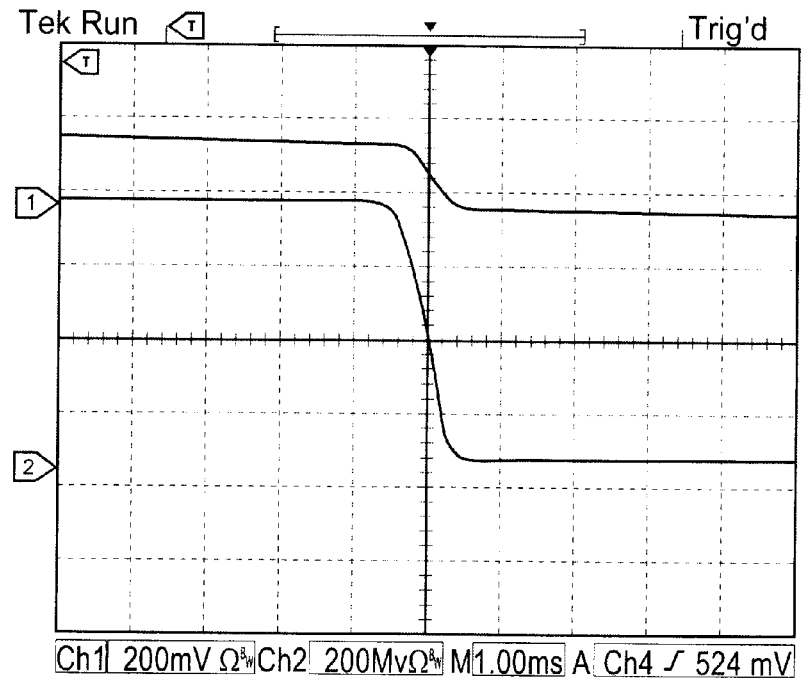

FIG. 4D represents the behavior of the same amplifier with the functional electronic gain controller. More specifically, it shows that the decrease in optical output power is now proportional to the decrease in optical input power and the absence of the transient output power spike.

Figure 5A:
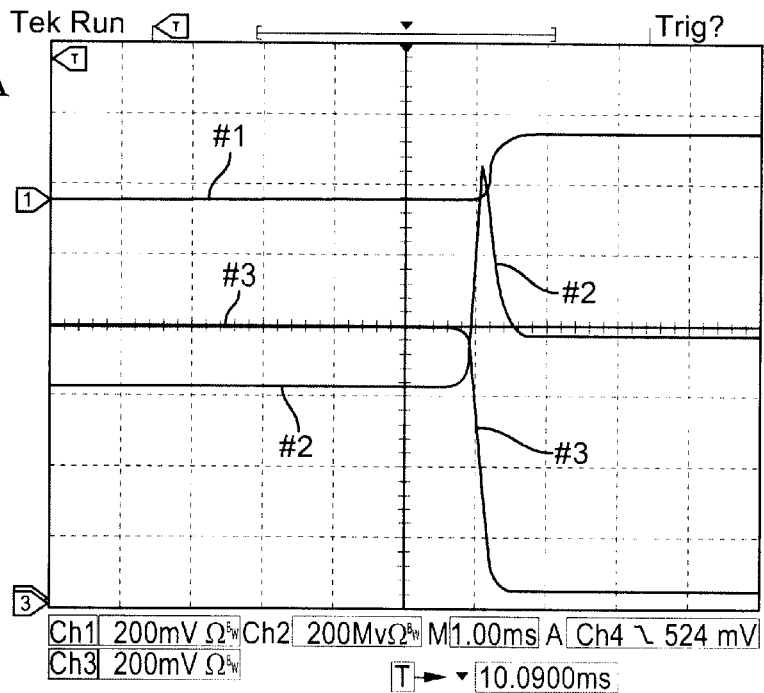
FIGS. 5A–5D illustrate the affect of the electronic controller in eliminating cross talk.

FIG. 5A illustrates the effect of crosstalk on surviving channel(s). More specifically, the vertical axis response to the optical power, and the horizontal axis represents time t. Curve #1 represents the total input power at any one time. Curve #2 represents total output power, and curve #3 represents output power of the surviving channel. From the time period of t=0 to t≈5.8 msec only one signal input power is present ($\lambda_c$=1533.47 nm). At time t≈5.8 msec additional 32 channels were added (1528 nm≦$\lambda_{ci}$≦1565 nm). Thus, Curve #1 of FIG. 5A illustrates that the total input optical power went up at time t≈5.8 msec. Curve #2 corresponds to the total output optical power. Curve #2 shows a large transient spike at time t≈5.8 msec. Curve #3 corresponds to the output power of the original dropped channel. Curve #3 shows that the output power of the original channel dropped when the other channels were added. This is the evidence of undesirable crosstalk between the channels.

Figure 5B:
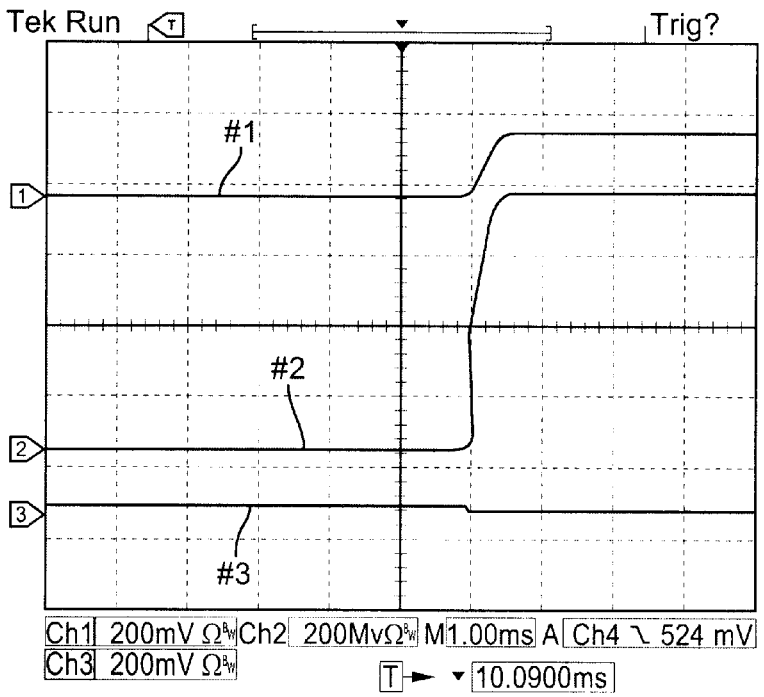

FIG. 5B illustrates the behavior of the same amplifier with the functional electronic gain control. This figure illustrates that the power of the original channel did not change with addition of other channels. Thus, the controller successfully eliminated crosstalk while preserving the gain of the amplifier at 20 dB.

Figure 5C:
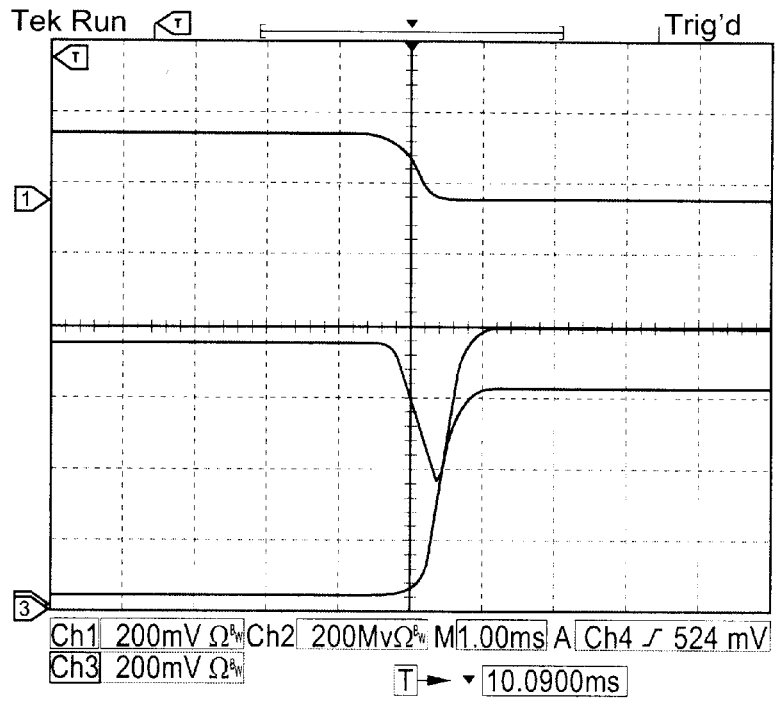
Figure 5D:
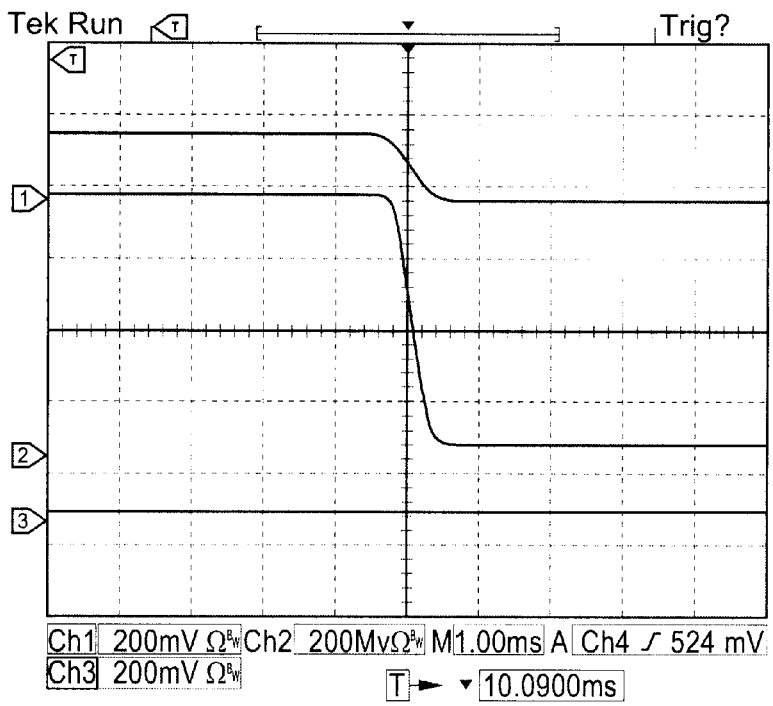

FIGS. 5C and 5D are similar to FIGS. 5A and 5D, but illustrate the behavior of the amplifier when the channels are dropped. FIG. 5C illustrates the effect of crosstalk on surviving channel(s). More specifically, the vertical axis corresponds to the optical power, and the horizontal axis represents time t. Curve #1 represents the total input power at any one time. Curve #2 represents total output power, and curve #3 represents output power of the surviving channel. From the time period of t=0 to t≈5.8 msec a total of 33 channels was present. At time t≈5.8 msec 32 channels were dropped. Thus, curve #1 of FIG. 5A illustrates that the total input optical power went down at time t≈5.8 msec. Curve #2 corresponds to the total output optical power. Curve #2 shows a large negative transient spike at time t≈5.8 msec. Curve #3 corresponds to the output power of the original dropped channel. Curve #3 shows that the output power of the original channel increased when the other channels were dropped. This is also the evidence of undesirable crosstalk between the channels.

FIG. 5D illustrates the behavior of the same amplifier with the functional electronic gain control. This figure illustrates that the power of the original channel did not change with drop of other channels. Thus, the controller successfully eliminated crosstalk while preserving the gain of the amplifier at 20 dB.

The controller 120 described in a previous section can be significantly simplified if the amount of signal monitoring, remote commands, and alarm processing is reduced to a minimum. In this case the controller 120 can be a single processor embedded system. It is required that this single processor embedded system includes a high-speed (equal to or greater than 150 MHz clock rate) processor, such as a fast DSP processor. An example of this processor is a Motorola processor 56311™. The controller 120 preferably has at least two control feedback loops—a fast control loop utilized for automatic gain control and a slow loop for pump laser temperature control, or for rear earth doped fiber temperature control, for example. Minimum processing speed in the fast loop cannot be lower than 0.5 MHz rate, while the slow loop can operate at around 1 Hz to 10 kHz. It is preferred that the fast loop operates in the range of 500 kHz to 10 MHz.

If the high-speed transients suppression is less important than steady-state control of gain or output power and, the amplifier module is required to monitor and process high volume of low speed signals such as remote commands and alarms a slower embedded system, with floating-point arithmetic capability can be used. A typical processor would include a Motorola Power PC™ running an "off the shelf" embedded operating system such as VX Works™. The low frequency characteristics of the signals being processed allow implementation of more computationally demanding control/processing algorithms, such as adaptive control. This system can take care of system adjusting set points, remote commands, alarm processing, gain and temperature control, control parameters tuning, etc.

EXAMPLE

Figure 6:
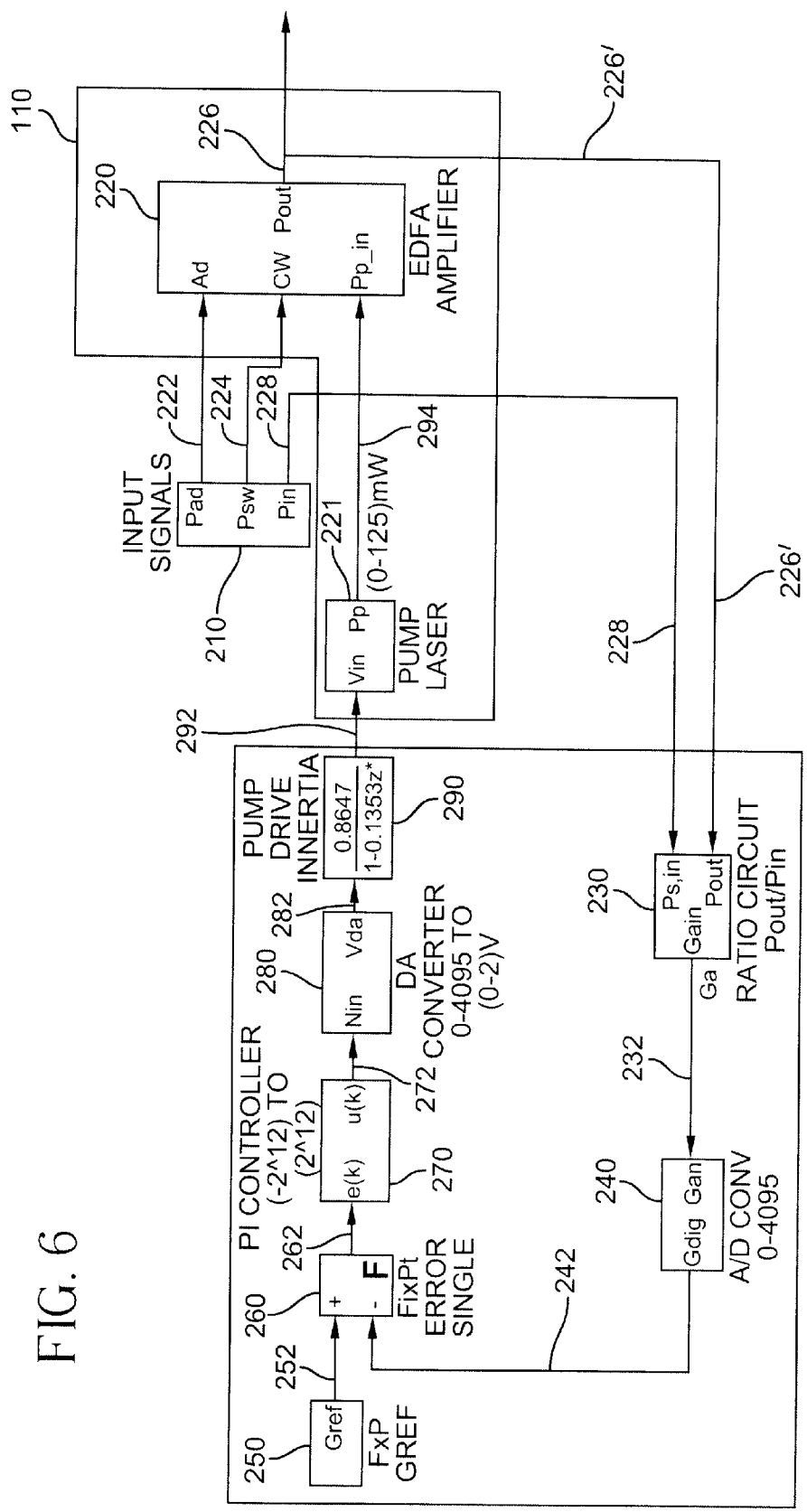
FIG. 6 is a schematic simulation block diagram of an optical amplifier operating in gain control mode.

In order to illustrate transient control capabilities of the controller 120 simulations have been done for both for the gain and output power control modes of the amplifier. A classical proportional plus integral (PI) control algorithm is used in both cases. FIG. 6 shows a simulation block diagram corresponding to the amplifier operating in gain control mode. This simulation block diagram depicts the optical section 110 and the electronic controller 120.

The optical section 110 includes EDFA 220 and pump laser(s) 221. At least two optical input signals 222 and 224 are provided to EDFA 220 from the input port 210. The power provided by the signal 222 is variable. Thus, signal 222 represents adding and dropping channels. The signal 224 has a constant value and represents the surviving channels entering the optical amplifier. The optical section 110 of the amplifier amplifies the signals 222 and 224 and provides an amplified output signal 226. A small part 226' of the output signal 226 is provided to the controller 120. A taped input signal 228 is proportional to the total input power provided by lines 222 and 224. This taped signal 228 is also provided to the controller 120.

According to FIG. 6, the electronic controller 120 includes a gain calculation block 230, analog-to-digital converter (AD) block 240, gain setpoint block 250, gain error calculation block 260, PI control block 270, digital-to-analog converter (DA) block 280 and pump drive circuit block 290. The gain calculation block 230 calculates the amplifier gain 232 based on the powers of the taped output and input signals 226 and 228, respectively. The AD block 240 converts analog value of the gain provided to block 240 by signal 232 to a digital form. This digital value of calculated gain 242 is compared in the gain error calculation block 260 with the gain set point value provided by the gain setpoint block 250. The calculated gain error 262 enters the PI control block 270. This block 270 calculates and provides the control signal 272 for the DA converter 280. This control signal 272 is in a digital form and it is converted into an analog form by the DA converter block 280. The output 282 of the DA converter block 280 enters the pump drive circuit 290. This pump drive circuit 290 controls the pump laser 221. The pump laser 221 provides the amplifier section 110 with necessary optical power, which keeps the amplifier gain 228 equal to the gain set point value 252.

Figure 7A:
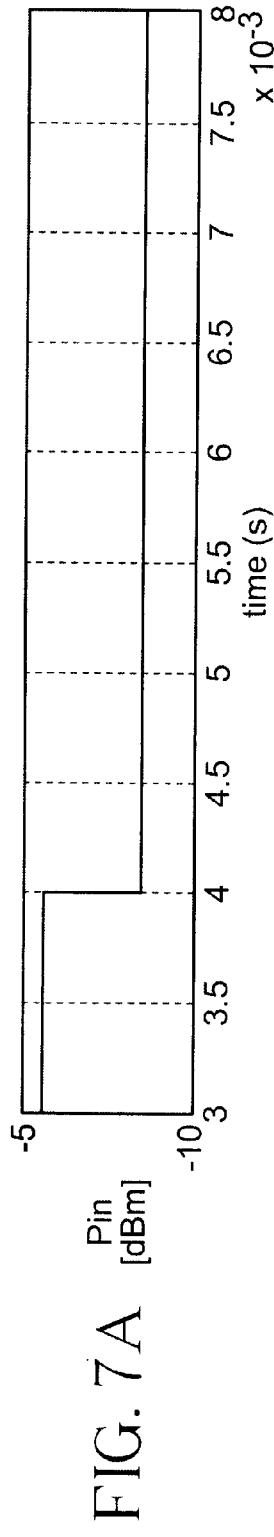
FIGS. 7A–7D illustrate the closed-loop performance of the amplifier with automatic gain control mode.
Figure 7B:
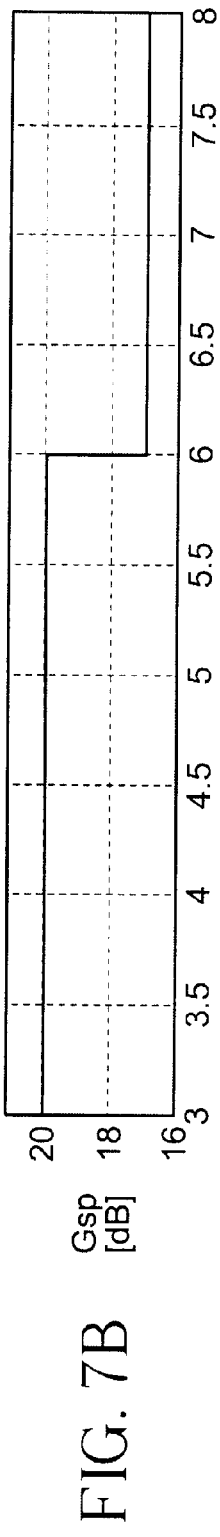
Figure 7C:
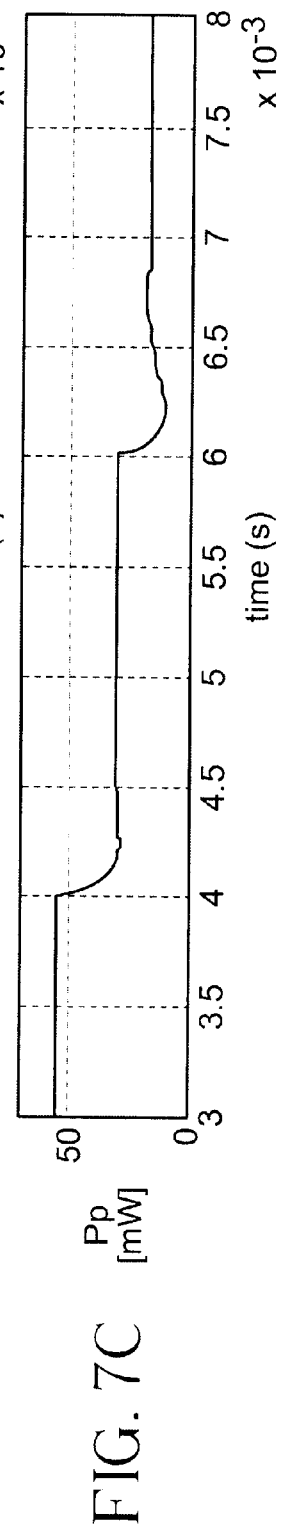
Figure 7D:
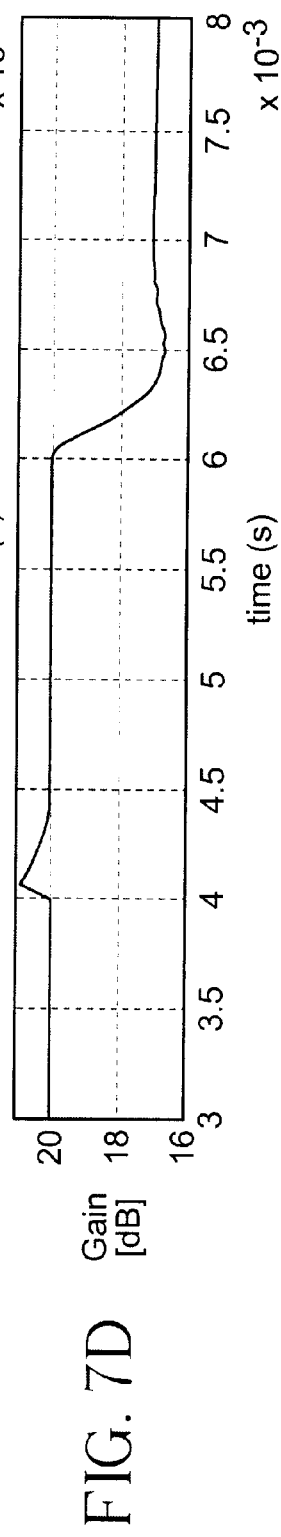

FIGS. 7A–7D illustrate the closed-loop performance of the amplifier with automatic gain control mode. (By closed loop we mean that the control algorithm is in place and provides feedback control.) FIGS. 7A, 7B, 7C illustrate the behavior of the input signal $P_{in}$, gain set point Gsp and pump power Pp, respectively. More specifically, FIG. 7A illustrates that input signal power drops from −5.23 dBm (0.3 mW) to −8.24 dBm (−0.15 mW) at time t=4 msec. FIG. 7B illustrates a change in the gain setpoint. More specifically, gain setpoint Gsp (desired value of gain) changes from 20 dB to 17 dB at time t=6 msec. FIG. 7C illustrates that pump laser power drops when the input power drops because the amplifier is in the gain control mode, i.e. the total output optical power is proportional to the total input power. Drop in the pump power is not instant but goes through transient period of 250 microseconds. FIG. 7C also illustrates that the optical power of laser pump drops when the gain setpoint is set at a lower value. Thus, at time t=6 ms, when the gain setpoint drops (see FIG. 7B) and input power does not change, the laser pump power drops in order to decrease the optical output power of the amplifier. FIG. 7D illustrates the effect of gain control on the gain of this amplifier. More specifically, this graph shows that at time t=4 msec, when the input signal power drops, the amplifier gain will go throught a short transient regime (in time period from 4 msec to 4.5 msec). During this period the pump laser will change its value to bring the amplifier gain back to its setpoint value of 20 dB. On the other hand, when the gain setpoint drops from 20 dB to 17 dB (at time t=6 msec) the pump control signal (FIG. 7C) will start to change in order to decrease the actual amplifier gain. After transient period of 0.75 msec, the amplifier gain will be equal to the new set point value o 17 dB.

Figure 8:
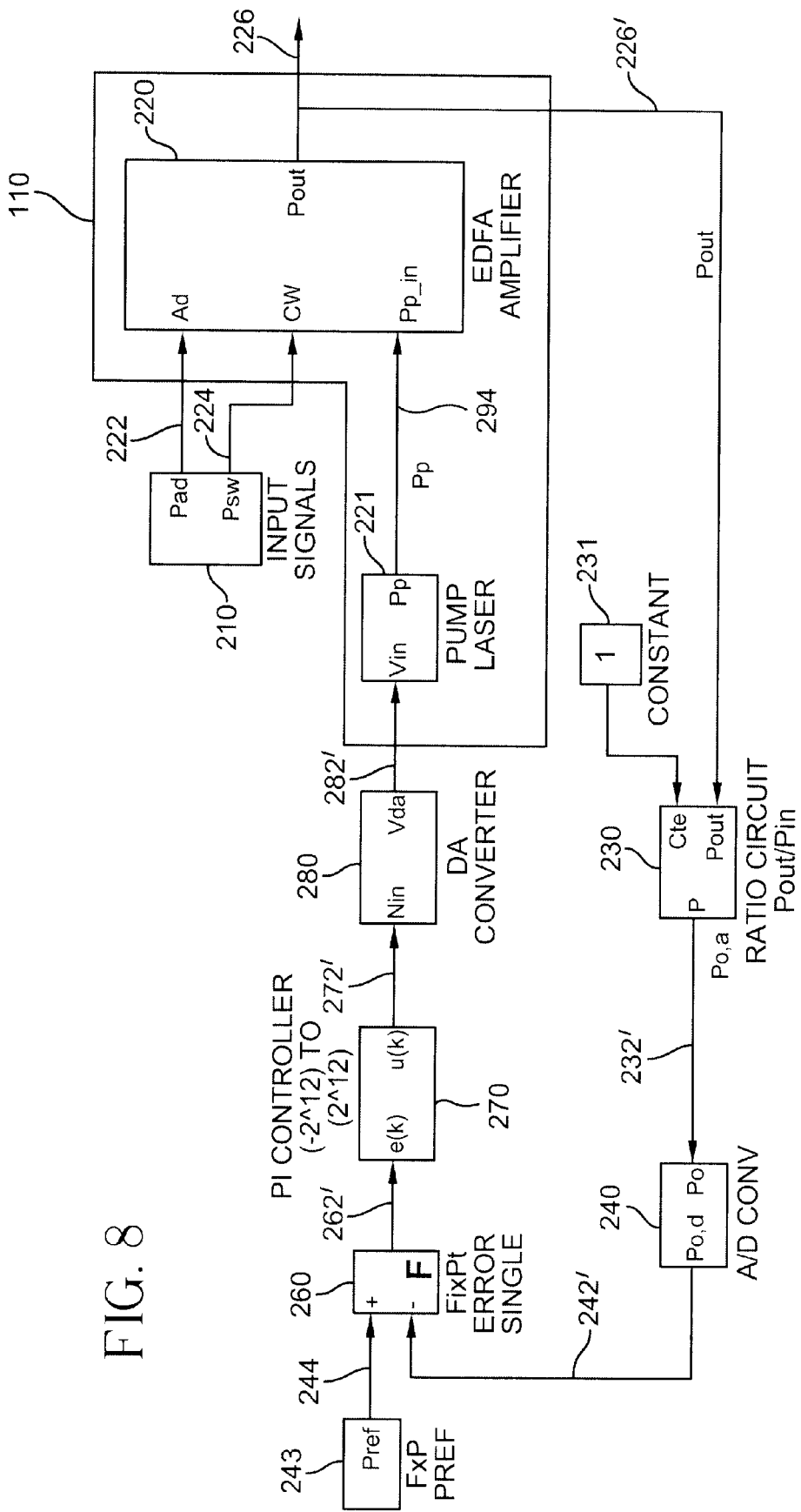
FIG. 8 is a schematic simulation block diagram of an optical amplifier operating in electronic power control mode.

FIG. 8 shows a simulation block diagram corresponding to the amplifier operating in the power control mode. This simulation block diagram depicts the optical section 110 and the electronic controller 120.

The optical section 110 includes EDFA 220 and pump laser(s) 221. At least two optical input signals 222 and 224 are provided to EDFA 220 from the input port 210. The power provided by the signal 222 is variable. Thus, signal 222 represents adding and dropping channels. The signal 224 has a constant value and it represents surviving channels entering the optical amplifier section 110. Signal 226, as before, represents the output power of the amplifier.

The AD block 240 converts analog value of the output power (provided to block 240 by the output signal portion 226') to a digital form. This digital value of output power 242' is compared in the power error calculation block 260 with the output power set point value 244, provided by the output power setpoint block 243. The calculated power error 262' enters the PI control block 270. This block 270 determines the control signal 272' for the pump laser 221. This control signal 272' is in a digital form and it is converted into an analog form by the DA converter block 280. The output of this converter block 280 enters the pump laser 221. The pump laser 221 provides the optical section 110 with necessary optical pump power, which keeps the total output power 226 of the amplifier 100 equal to the output power set point value 244.

FIGS. 9A–9D illustrate the closed-loop performance of the amplifier with automatic power control mode. FIGS. 9A, 9B, 9C illustrate the behavior of the input signal $P_{in}$, output power set point (i.e. desired amount of output power Po and, pump power signal $P_p$, respectively. More specifically, FIG. 9A illustrates that input signal power dropped from −2.22 dB (approx 0.6 mW) to approx. −4 dBm (0.4 mW) at t=4 msec. FIG. 9B illustrates that the output power setpoint $P_{o,sp}$ increased from 13 dBm 20 mW (approx 20 mW) to 16 dBm (40 mW) at time t=2.5 msec. FIG. 9C illustrates the resultant changes in pump optical power, $P_p$. More specifically, FIG. 9C illustrates that at time t=2.5 ms when the output power setpoint 244 increases, the pump power 294 also increases in order to drive the output power 226 of the amplifier to its new set point value 244 of 40 mW. The pump power increases again at t=4 msec, when input signal 222 drops. This increase in pump power at t=4 msec is needed because it needs to make up for lost power in the amplifier due to the input signal drop. FIG. 9D corresponds to the actual output power 226 provided by this amplifier. Note that after the output setpoint changed (FIG. 9B) the output of the amplifier starts to increase from 13 dBm to 16 dBm. The transient time (the time needed for output power to change from 13 to 16 dBm) is approximately 250 microseconds. On the other hand, when the total optical input signal power (FIG. 9A) drops from 0.6 to 0.4 mW, the amplifier output power 226 will first go down, and than will go back to its original setpoint value of 16 dBm (40 mW). In this case the transition time is close to 0.5 mseconds.

The exemplary amplifier 100 of the present invention has a controller 120 with a capability of output power and gain transient suppression and temperature control of the laser pump diode. Control requirements, such as set point and control mode are remotely sent to the amplifier 100 via standard interface (serial, parallel or Ethernet). Monitoring signal and alarms from the amplifier are received by using the same interface. Two embedded processors allow high level of flexibility in the choice of control and processing algorithms. The technique of signal compression and dynamic range switching makes this device suitable for use in systems with very wide dynamic range of signals. This particular amplifier 100 utilizes two independently controlled pump lasers. The second pump is used to boost the signal power. The controller 120 may also utilize more sophisticated control algorithms, which can cope with some long-term effects, such as parameter changes caused by the optical component aging.

Accordingly, it will be apparent to those skilled in the art that various modifications and adaptations can be made to the present invention without departing from the spirit and scope of the invention. For example, the controller 120 can be utilized with non-erbium-doped fiber amplifiers, for example, Tm-doped amplifiers. It may also be utilized in amplification systems that include Raman amplifiers, or planar waveguide amplifiers. It is intended that the present invention covers the modifications and adaptations of this invention as defined by the appended claims and their equivalents.

What is claimed is:

1. An amplifier characterized by gain and output power comprising:
    (i) at least one gain medium;
    (ii) at least one pump supplying optical power into said gain medium;
    (iii) a controller controlling said gain and said output power of said amplifier, said controller including a signal compression circuit to cover a wide dynamic range for optical input and out put signals, so that resolution for optical signals below −25 dBm level is better than resolution for optical signals at or above −3 dBm level.

2. The amplifier according to claim 1, wherein said gain medium includes at least one coil of rare earth doped fiber.

3. The amplifier of claim 1, wherein said controller utilizes a logarithmic circuit.

4. The amplifier of claim 1, wherein said controller utilizes electronic gain switch circuit.

5. The amplifier of claim 2, wherein said controller utilizes a logarithmic circuit.

6. The amplifier of claim 2, wherein said controller electronic gain switch circuit.

7. The amplifier of claim 1, wherein said controller utilizes at least two feedback loops, one of said loops being a fast loop and another one of said feedback loops being a slow loop, wherein said slow loop operates in the range of 1 Hz to 10 kHz, and said fast loop operates in the range of 500 KHz to 10 Mhz.

8. The amplifier of claim 7, wherein said fast loop is pump power control loop, and said slow loop is pump temperature control loop.

9. The amplifier of claim 8, said slow loop is also temperature control loop of rare-earth doped fiber.

10. The amplifier of claim 1, wherein said controller utilizes only a slow control loop, said slow control operating in the range of 1–1000 Hz, and does not control power transients.

11. An amplifier characterized by gain and output power comprising:

(i) gain medium including rare earth-doped fiber;

(ii) a pump supplying optical power into said gain medium;

(iii) a controller controlling said gain and said output power of said amplifier, said controller including an electronic gain switch to cover a wide dynamic range for optical input and output signals, so that resolution for optical signals below −25 dBm level is better than resolution for optical signals at or above −3 dBm level.

12. The amplifier of claim 11, wherein said controller includes (I) an A/D converter, and (ii) an electronic gain switch, said electronic gain switch detects the level of electrical signal corresponding to optical signal level and, when said electrical signal is lower then a predetermined amount, and multiples that signal by a predetermined constant, providing this multiplied signal to A/D converter.

13. The amplifier of claim 11, wherein said controller includes (i) an A/D converter, and (ii) an electronic gain switch, and gain switch said electronic gain switch detects the level of electrical signal corresponding to optical signal level and, when said electrical signal is higher than a predetermined amount for a predetermined period of time, and lowers the electronic gain, provided by the electronic gain switch, so that the input to the A/D converter stays within its range, thereby preventing an overflow condition.

14. An amplifier according to claims 2, 4 and 13, wherein said electronic gain switch includes a circuit that utilizes hysteresis to prevent unwanted electronic gain switch oscillation.

15. The amplifier of claim 1, further comprising A/D converter that can covert multiple analog signals simultaneously into multiple digital signals.

16. The amplifier of claim 15, wherein one of said analog signals corresponds to optical input power and the other one of said analog signals corresponds to the optical output power.

17. The amplifier of claim 1, wherein said controller incorporates an automatic gain control, coil temperature and pump temperature control system and a communication/alarm processing system.

* * * * *